3,576,706
CARPET UNDERLAY
Gert F. Baumann, Bridgeville, and John F. Szabat, Pittsburgh, Pa., assignors to Mobay Chemical Company, Pittsburgh, Pa.
No Drawing. Filed July 25, 1968, Ser. No. 747,487
Int. Cl. B32b 5/18
U.S. Cl. 161—160                         8 Claims

ABSTRACT OF THE DISCLOSURE

Carpet underlay wherein a self-sustaining facing layer and a polyurethane foam layer are adhesively bound together. The polyurethane foam has certain critical properties including:
- a density of about 3 to about 8 pounds per cubic foot,
- an indentation load deflection of at least about 50 pounds at 25% deflection per 50 square inch area for at least an 0.5 inch thickness,
- a compression set below about 10% after 22 hours at 90% compression,
- a tensile strength of at least about 10 pounds per square inch,
- an elongation of at least about 50%, and
- a foam softening by linear shear of less than 50%.

---

This invention relates to foam carpet underlay and more particularly to an improved polyurethane foam carpet underlay adhesively bonded to a facing sheet.

Lying underneath many carpets, along with the proverbial dust, is a carpet underlay or cushion to give the carpet a more luxurious feeling of thickness. In addition the carpet underlay is good for the carpet in that it increases the life of the carpet by preventing the fibers thereof from being ground to pieces by the repeated mashing of the carpet against a hard surface. In other words, the cushion protects the fibers of the carpet due to its flexibility and resilience as people repeatedly tread on the carpet. Much of the heretofore known carpet underlay (which is a term coined recently for the type of material set forth in this disclosure which is also referred to as carpet padding or carpet cushioning) is made out of a felt from jute and/or hair or of blown sponge or latex foam rubber.

More recently much of the carpet underlay has been made of synthetic polyurethane foam plastic. Initially the polyurethane foam carpet underlay was low quality, low density material that crumbled, wrinkled and often, because of poor hydrolysis resistance, stuck to the floor. It has been heretofore discovered that a polyether based polyurethane foam is necessary in order to have good resistance to crumbling and sticking to the floor. Furthermore, it has been discovered heretofore that a facing sheet is desirable for the carpet underlay to facilitate laying the carpet and also to help to prevent wrinkling of the carpet underlay under repeated flexing. In other words, the facing sheet tends to prevent creep of the foam underlay because of the support given by the facing sheet.

The heretofore known polyether based carpet underlay, even when it is produced with a high density surface, had a disadvantage of poor retention of resiliency. In order to overcome this difficulty it has been proposed heretofore to grind up scrap foam and bond it together with a urethane adhesive and then slice it into thin sheets to be used as an underlay for carpet. This is the so-called rebonded urethane carpet underlay. The difficulty with this product is that it is not uniform due to the grinding operation and it will invariably have spots that are softer or harder so that when one steps on the carpet one step may produce an intensively resilient feeling while on the next step the carpet bottoms out with a spine jerking thump.

It is therefore an object of this invention to provide an improved polyurethane foam carpet underlay. Another object of this invention is to provide an improved laminated article of polyurethane foam having a facing sheet on one surface. Still a further object of this invention is to provide an improved method of preparing polyurethane foam carpet underlay. A further object of this invention is to provide an improved high density carpet underlay which is economical to produce and which a manufacturer can conscientiously guarantee for the life of the carpet. Another object of this invention is to provide an improved carpet underlay based on a particular type of polyurethane foam which has properties that will prevent the carpet from bottoming out when someone steps on it, which will prevent wrinkling of the carpet because of the underlay creeping into bunches, which will have improved wear properties and which will be easy to lay underneath a carpet.

The foregoing objects and others which will become apparent from the following description are accomplished in accordance with the invention, generally speaking, by providing a carpet underlay having a self-sustaining facing layer ad a polyurethae foam layer, facing surfaces of said layers being adhesively bound together, said polyurethane foam having (a) a density of about 3 to about 8 pounds per cubic foot, preferably 3 to 6 pounds per cubic foat,
(b) an indentation load deflection of at least about 50 pounds, preferably 60 to 100 pounds, at 25% deflection per 50 square inch area for at least a 0.5 inch thickness,
(c) an indentation load deflection of at least 95 pounds, preferably 110 to 400 pounds, at 65% deflection per 50 square inch area for at least a 0.5 inch thickness,
(d) the ratio of the 65% indentation load deflection to the 25% indentation load deflection being at least 1.9, preferably at least 2.5,
(e) a compression set below about 10% after 22 hours at 90% compression, at 70° C.,
(f) a tensile strength of at least about 10 pounds per square inch,
(g) an elongation of at least about 50%, and,
(h) a foam softening by linear shear of less than 50%.

Thus, this invention contemplates an improved carpet underlay wherein a sheet of a particular type of polyurethane foam is laminated to a facing sheet on at least one surface. The carpet underlay of this invention when formulated in accordance with the invention has excellent tensile strength, load bearing, compression set and density so that it can be economically produced and used. Heretofore, only scrap polyurethane foam could be formulated for this use since the new uncut polyurethane foam did not have the ability to stand up in this application.

It is to be understood that the particular type of polyurethane foam specified above is essential in order to produce a carpet underlay which will satisfy the objects of this invention. If the density is below 3 pounds per cubic foot the foam has insufficient firmness and body to provide the right feeling of comfort and luxury when one steps on a carpet laid over the carpet underlay. If the density is above 8 pounds per cubic foot the underlay is too expensive. It is best for the density of the polyurethane foam to be used as carpet underlay to be in the range of 3 to 6 pounds per cubic foot.

But density alone is not the whole story since it is also necessary for the polyurethane foam to have a certain compression deflection property. The indentation load deflection property which is important for this use is best measured as the amount of force necessary to compress a 50-square-inch piece of foam to at least 25% of its original height when the foam has a thickness of at least ½ inch. This value should be at least 50 pounds and it is better for the value to be from 60 to 100 pounds. If the value is below 50 pounds, as was the case for much of the heretofore known carpet underlay where the value was only 20 to 40 pounds, then the carpet underlay tended to feel soft and sleazy giving even a relatively luxurious carpet an unwarranted impression of poor value. In addition, the indentation load deflection at 65% deflection should be greater than 95 pounds when measured on a piece of foam having an area of at least 50 square inches and a thickness of at least ½ inch. It is also important that the ratio of the 65% indentation load deflection value to the 25% value be at least about 1.9 and preferably greater than about 2.5. The ratio is important to the overall utility of the product as a carpet underlay because this property best measures the type of foam which does not bottom out when one steps on it. Furthermore the compression set property of the polyurethane foam must be below 10% after the foam has been subjected to 90% compression for 22 hours. If the compression set is more than 10%, the foam will flatten out under the carpet and lose its resiliency and give even a good carpet a feeling of poor quality. The tensile strength of the foam used for carpet underlay is also important since tensile strength of the carpet underlay is particularly necessary in order to lay it on the floor without tearing. If the tensile strength is below 10 pounds per square inch it is possible to rip the carpet underlay in the course of positioning it on the floor. It must be understood that unless both sides of the carpet underlay are adhered to a smooth facing layer that the rough foam tends to adhere to and is difficult to slide across the floor. This adherence alone is often enough to tear the foam if the tensile strength is below 10 pounds per square inch. A tensile strength above 20 pounds per square inch can be obtained in some foam formulations but is seldom necessary in order to overcome the difficulties of the prior art carpet underlays. It is preferred to have a tensile strength of at least 15 pounds per square inch. Last but not least is the elongation property. An elongation of at least 50% and preferably at least 100% is desired in order to overcome the tendency of heretofore known carpet underlays to buckle, wrinkle and cause bulges underneath a carpet. When the elongation property of the foam for carpet underlay is not at least 50%, as was often the case with heretofore known carpet underlays, the foam buckled and caused unsightly wrinkles and bulges oftentimes in the middle of the room or at places where furniture had been moved across the rug. Only carpet underlay showing less than 50% softening by linear shear will hold up well in use. Foams with higher softening, for example 70%, show rapid deterioration. Linear shear is measured as follows:

A 15 inch x 15 inch x ½ inch piece of urethane foam is placed on a flat table and covered with sail cloth. A 20 inch long, 3½ inch diameter steel roller is placed on the foam at an angle of 30° to its long axis. The roller is passed back and forth over the entire length of the foam sample for 4 hours at a rate of 50 cycles per minute using a 150 pound loading. The load bearing is measured in pounds/50 square inch at 25% and 65% deflection points before and after the linear shear treatment. The differential in load bearings in indicative of the foam softening.

It must also be understood that all of these properties taken together are important in order to produce a satisfactory polyurethane foam carpet underlay.

While there are a number of foam formulations which will produce a polyurethane foam having the properties essential to the preparation of a good carpet underlay that can be guaranteed for the life of a carpet, one formulation which will produce the points essential to this invention is prepared by reacting any suitable organic polyisocyanate with any suitable polyol which will yield the desired foam. One way to achieve the above properties is to employ polyether polyols which have had polymerized therein an ethylenically unsaturated monomer. Any suitable polyol which has had polymerized therein an ethylenically unsaturated monomer may be used. It is particularly preferred, however, to use a modified polyhydric polyalkylene ether which has been prepared by effecting polymerization of one or more ethylenically unsaturated monomers in situ in a polyhydric polyalkylene ether. The modified polyhydric polyalkylene ether may be used alone but it is preferably mixed with an additional polyhydric polyalkylene ether which is preferably a polyhydric polyalkylene ether triol, tetrol or pentol. Any suitable polyhydric polyalkylene ether may be used as the medium for the polymerization of the ethylenically unsaturated monomer including, for example, polyalkylene ether glycol, polybutylene ether glycol and the like which preferably have a molecular weight of from about 500 to about 5000, most preferably 1500 to 3000. Any suitable ethylenically unsaturated monomer containing one or more polymerizable double bonds may be used, for example, aromatic vinyl compounds such as styrene; olefinic hydrocarbons such as ethylene, propylene, 1-butylene, 2-hexene, 1,4-hexadiene, 1,3-butadiene and 2-pentene; vinyl esters such as vinyl acetate, vinyl propionate and the like; vinyl halides such as vinyl chloride, vinylidene dichloride and the like; acrylic acid, methacrylic acid and derivatives thereof such as methacrylate, acrylate, acrylonitrile; and monomers with more than one vinyl group, for example triallyl cyanurate, and glycol dimethyl acrylate. The ethylenically unsaturated monomers may be used either alone or mixed with one another.

Any suitable polyhydric polyalkylene ether may be used in admixture with these ethylenically unsaturated monomers but it is preferred to use substantially linear polyalkylene ether glycols which preferably have a molecular weight of from about 400 to about 5000 and an hydroxyl content of from about 0.5 to about 15 percent. The polyhydric polyalkylene ethers formed by the condensation of alkylene oxides, for example, ethylene oxide, propylene oxide, 1,2- and 1,3-butylene oxide, styrene oxide, epichlorohydrin and tetrahydrofuran. A polypropylene ether glycol having a molecular weight of from 500 to 3000 is particularly preferred. These alkylene oxides may be polymerized by the addition of an initiator in accordance with procedures well known in the art or they may be condensed with polyhydric alcohols or amines, for example, ethylene glycol, 1,2-propylene glycol, trimethylolpropane, 1,4-butane diol, 1,2,4-butane triol, glycerine, sorbitol, sucrose, glycose, alpha-methyl-d-glucoside, pentaerythritol, castor oil, ethanol amine, diethanol amine, triethanol amine, aniline, 2,4-tolylene diamine, 2,6-tolylene diamine, 4,4'-diamino-diphenyl methane; alkylene diamines such as, for example ethylene diamine, tetramethylene diamine, hexamethylene diamine and the like. Mixtures of the linear and branched polyhydric polyalkylene ethers of the various types may also be used. Moreover, it is possible to use prepolymers formed from the polyhydric polyalkylene ethers mentioned above which have been reacted with a less than equivalent amount of a reactive group to prepare compounds containing inter alia, urethane groups and ester groups. Examples are the reaction product of toluylene diisocyanate with an excess of a low molecular weight polypropylene ether glycol or the reaction product thereof with a dicarboxylic acid such as adipic acid. A suitable toluylene diisocyanate for this purpose is a mixture of 80 percent 2,4- and 20 percent 2,6-toluylene diisocyanate and a suitable polypropylene ether glycol is one having a molecular weight of about 425.

The modification of the polyhydric polyalkylene ether is carried out in a straightforward manner by dissolving the ethylenically unsaturated monomer in the polyhydric polyalkylene ether preferably in an amount of 1 to 60 percent by weight in particular from 1 to 30 percent by weight and then bringing about polymerization of the ethylenically unsaturated monomer while it is mixed with the polyhydric polyalkylene ether. It is desirable to carry out the polymerization in the absence of oxygen but it is not necessary to carry out the reaction in the absence of air even though this, too, is desirable. Initiators for the polymerization reaction include the usual radical formers such as peroxides, e.g. lauroyl peroxide, benzoyl peroxide, dicumyl peroxide and the like as well as nitrogen containing initiators such as azodiisobutyronitrile. Redox systems may also be used such as benzoyl peroxide-diethyl toluidine and polymerization systems utilizing metal ions as catalysts such as ferrous-ferric iron systems. Initiation of the polymerization may also be effected by high energy radiation. The radical formers may be used in any convenient amount but it is preferred to use from 0.01 to 15 percent by weight and preferably from 0.1 to 5 percent by weight based on the weight of the polymerizable compound. Any order of addition may be used but it is convenient to dissolve the polymerization initiator in the vinyl compound or in other words, the ethylenically unsaturated monomer, and then combine this mixture with the polyhydric polyalkylene ether which is then homogenized and polymerized by heating preferably in the absence of air. Occasionally, it may be desirable to filter off some polymer agglomerates which are formed in the reaction mixture before the polyhydric polyalkylene ether containing the polymerizate is reacted with an organic polyisocyanate. These polyhydric polyalkylene ethers containing the polymerizate may be used either alone or mixed with preferably no more than about 50% by weight of other organic compounds containing active hydrogen groups as determined by the Zerewitinoff method.

Any suitable compound containing active hydrogen containing groups may be used alone to prepare the foams. For example, linear or branched polyesters including polyester amides, unmodified polyhydric polyalkylene ethers, reaction products of the amino alcohols, diamines, hydroxyamines, or the like with alkylene oxides or carboxylic acids to prepare various mixtures of polyols. Particularly suitable polyesters are those formed from polyhydric alcohols such as ethylene glycol, 1,3-propylene glycol, 1,4-butane diol, glycerine, trimethylolpropane, 1,2, 6-hexane triol, pentaerythritol, sorbitol and dipentaerythritol reacted with polycarboxylic acids such as adipic acid, sebacic acid, succinic acid, 1,4-benzene dicarboxylic acid, 1,3,5-benzene tricarboxylic acid and the like. Suitable polyester amides are prepared by reacting amino alcohols with the aforementioned polycarboxylic acids or by reaction thereof with mixtures of amines and polyhydric alcohols. Any suitable amino alcohol may be used such as ethanol amine, propanol amine and the like. Any suitable diamine may be used such as ethylene diamine, propylene diamine, toluylene diamines such as 2,4-toluylene diamine, hydroxyamines such as diethanol amine. Another way to make polyester amides is to include in the reaction mixture leading to the production of a polyester some amino carboxylic acid such as, for example, alanine and the like. The polyesters, polyester amides and the like may contain hetero atoms such as are obtained by including thiodiglycol in the reaction components, double or triple bonds such as are obtained by using ethylenically or acetylenically unsaturated compounds such as, for example, 3-hexene-1,6-diol and 3-hexyne-1,6-diol. In addition, saturated or unsaturated fatty acids and hydroxy acids may be included in the reaction mixture, for example, oleic acid, propionic acid, and the like as well as fatty alcohols, for example, lauryl alcohol.

While any suitable organic compound containing at least two active hydrogen containing groups as determined by the Zerewitinoff method may be used to prepare the polyurethanes, it is preferred to use polyether diols or triols which have a molecular weight of about 500 to about 10,000 and which are preferably prepared by condensing first propylene oxide, then ethylene oxide and then an aliphatic diol or aliphatic triol as set forth above. One may also use in conjunction with these polyether diols or triols low molecular weight chain extenders such as ethylene glycol, diethylene glycol, propylene glycol, 1,4-butane diol or the like.

Suitable organic polyisocyanates, preferably organic diisocyanates for the preparation of the polyurethane plastics of the invention include, for example, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3' - dimethyl-4,4'-biphenylene diisocyanate, 3,3' - dimethoxy-4,4'-biphenylene diisocyanate, 3,3'-diphenyl-4,4'-biphenylene diisocyanate, 4,4'-biphenylene diisocyanate, 3,3' - dichloro-4,4'-biphenylene diisocyanate, p,p',p''-triphenylmethane triisocyanate, 1,5-naphthalene diisocyanate, furfurylidene diisocyanate or polyisocyanate in a blocked or masked form such as the bis-phenyl carbamates or 2,4- or 2,6-toluylene diisocyanate, p,p'-diphenylmethane diisocyanate, p-phenylene diisocyanate, and 1,5-naphthalene diisocyanate. It is preferred to use aromatic diisocyanates and the commercially available mixture of toluylene diisocyanates which contain 80 percent 2,4-toluylene diisocyanate and 20 percent 2,6-toluylene diisocyanate or 4,4'- diphenylmethane diisocyanate is most preferred.

Crude isocyanates may be used such as, for example, crude toluylene diisocyanate obtained by the phosgenation of a mixture of toluylene diamines or crude 4,4'-diphenylmethane isocyanates (also referred to as crude polyphenyl methane diisocyanate) obtained by the phosgenation of crude 4,4'-diphenyl methane diamine. Crude 4,4'-diphenylmethane diamine is the reaction product of aniline and formaldehyde in the presence of HCl and contains some tri- and higher polyamines. A preferred unrefined or crude isocyanate is one having from 26 to 33 percent free —NCO and an amine equivalent of 120 to 150, such as, for example, a product having 32 percent free —NCO and an amine equivalent of 140. A specified crude isocyanate suitable for use in accordance with the present invention may be obtained by reacting 60 parts of aniline with 25 parts of formaldehyde (37 percent aqueous) and 74 parts of HCl (30 percent aqueous) at a temperature of 90° C. to 100° C. for 1.5 to 2 hours and then reacting this product with NaOH and separating out the crude amine. 100 parts of phosgene are then reacted with the crude amine until a product having an amine equivalent of 135 and containing 31 percent free —NCO is obtained. The free excess phosgene and substantially all of the solvents used, if any, are then removed. When toluylene diisocyanates, for example, are produced by conventional phosgenation of the corresponding diamines, a product containing 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of 80 percent, 2,4- and 20 percent 2,6-toluylene diisocyanate and the balance polymers incapable of accurate analysis.

The commercially available crude 4,4'-diphenylmethane diisocyanate (also referred to as polyphenyl methane polyisocyanate) having an assay of about 90 percent maximum, an amine equivalent of 141 maximum, 0.04 to 0.4 percent by weight hydrolyzable chloride, 0.1 to 0.6 percent by weight total chloride and having a flash point of 430° F. may be used. As pointed out above, when toluylene diisocyanate, for example, is produced by conventional phosgenation of the corresponding diamine, a product containing about 90 percent 2,4- and 2,6-toluylene diisocyanate, is obtained from the phosgenator. Of course, the product from the phosgenator is subjected to distillation to remove the solvent so that a product having 90 percent 2,4- and 2,6-toluylene diisocyanate is obtained. The initial product from the phosgenator in most cases contains 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in U.S. Pat. 2,950,307 are suitable.

The preparation of the polyurethane foams of the invention is carried out in the manner well known in the art by a rapid and thorough mixing of the organic polyisocyanate with the polyhydric polyalkylene ether containing polymerizates in the presence of water or other blowing agents to prepare a polyurethane foam. It is preferred in the production of the polyurethane foams to include an activator such as a tertiary amine or an organo metallic compound. Any suitable tertiary amine may be used such as, for example, dimethyl benzyl amine, N-methyl-N'(N-dimethyl amino ethyl) piperazine, triethylene diamine, permethylated diethylene triamine and the like. Any suitable organo metallic compound may be used such as those disclosed in U.S. Pat. 2,846,408. It is preferred to use organo tin compounds such as, for example, dibutyl tin dilaurate, dibutyl tin di-2-ethyl hexoate, stannous octoate, stannous oleate and the like. It is preferred to use a foam stabilizer for the production of the cellular polyurethane plastics such as, for example, sulphonated castor oils and sodium salts thereof. Where polyhydric polyalkylene ethers are included in the reaction mixture to prepare a cellular polyurethane foam, it is preferred to employ a silicone oil such as that disclosed in U.S. Pat. 2,834,748 within the scope of the formula

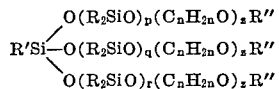

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to about 26 to 34. Most preferred is a compound having the formula

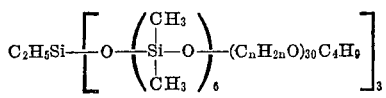

wherein $(C_nH_{2n}O)$ is a mixed polyoxyethylene and oxypropylene block copolymer containing about 17 oxyethylene units and about 13 oxypropylene units.

The particular foam set forth above is typical of the formulations which may be used to prepare carpet underlays having the essential properties set forth above. It is often preferred to include a filler in the formulation such as, for example, barium sulfate, calcium sulfate, silica, zirconium silicate and the like. The fillers are employed in an amount of at least about 10% by weight and preferably in an amount of from about 20% to about 50% by weight since these amounts enable one to obtain polyurethane foams which have the desirable properties set forth above.

In accordance with one preferred embodiment of the invention a polyurethane foam having the properties set forth above is prepared from about 60 to about 80 parts of a polyalkylene ether glycol which has had polymerized therein an ethylenically unsaturated monomer and particularly a polypropylene ether glycol having a molecular weight of about 2000 which has had polymerized therein about 200 grams of styrene and about 100 grams of 2-ethylhexyl acrylate are mixed with about 20 to 40 parts of an adduct of propylene oxide and trimethylolpropane, glycerine or the like which has a molecular weight of about 3000 and about 60 to about 80 parts of barium sulfate. Sufficient of this pre-mix to amount to about 170 parts is then mixed with about 30 to 35 parts of a mixture of 80% 2,4- and 20% 2,6-toluylene diisocyanate, about 0.3 to about 1 part of triethylene diamine, about 0.25 to 1 part of silicone stabilizer and about 0.2 part of stannous octoate. This particular formulation will produce a polyurethane foam which has a tensile strength of about 15 pounds per square inch, an elongation of about .150% and a compression set of 10% maximum after 22 hours compression to 90% at 158° F. The foam, after it is cured, is sliced into sheets ranging in thickness from ¼ inch to 9/16 inch generally speaking and in width up to about 6 feet. It is then provided with a facing sheet in face-to-face contact. The purpose of this covering layer is as set forth for example in British Pat. 1,081,568 to facilitate laying a carpet over the carpet underlay and also to help to keep the carpet underlay from wrinkling under the carpet after extended use. This facing or covering layer may be of woven or non-woven cloth but it is preferably a self-sustaining thermoplastic film of, for example, polyvinyl chloride, polyethylene, polyamide, polybutadiene, polypropylene, polyvinyl alcohol, polycarbonate, polyvinyl acetate, copolymers of vinyl chloride and vinyl acetate and polyurethane. The thickness of the facing sheet is preferably in the range of from about 0.5 to 10 mils. If a thermoplastic synthetic resin facing sheet is used it can be laminated to the polyurethane foam sheet in accordance with the procedure of British Pat. 1,081,568. However, employment of that procedure is not essential to the production of the present invention or to the production of the article of the present invention. One can also provide a polyurethane facing sheet, for example, by a transfer coating process wherein the polyurethane coating is deposited onto a mold release surface and then, before it is completely cured, it is transferred by a roller transfer coating process to the polyurethane foam and thus becomes cured and chemically bonded thereto. In addition the surface of the polyurethane foam can be roller coated with various latex paints, polyurethane plastics and the like.

In accordance with another preferred embodiment of this invention polyurethane foams are prepared based on a polyphenyl polymethylene polyisocyanate, a polyether based on trimethylol propane which has been first condensed with propylene oxide and then condensed with ethylene oxide to a molecular weight of about 6500 and diethylene glycol as a chain extender. Further details can be taken from the working examples set out below.

The carpet underlay of this invention is an improvement over heretofore known carpet underlay in that it has an even and yet firm support for the carpet throughout the width and breadth thereof. In addition, with the facing layer provided and the particular polyurethane foam sheet this carpet underlay will resist stretching, will resist hydrolysis and can be conscientiously guaranteed for the life of the carpet.

The invention is further illustrated by the following examples in which parts are by weight unless otherwise specified.

EXAMPLE 1

The polyurethane foam is prepared in a first step as follows:

About 70 parts of the graft copolymer prepared by polymerizing about 200 parts of styrene and about 125 parts of 2-ethyl hexyl acrylate in about 400 parts of polypropylene ether glycol having a molecular weight of about 200 is mixed with about 30 parts of the condensation product of propylene oxide with trimethylolpropane which has a molecular weight of about 3000 and about 70 parts of barium sulfate having a particle size in the range of about 0.5 to about 2.5 microns. This mixture of polyols and barium sulfate is then mixed with about 33 parts of a mixture of about 80% 2,4- and about 20% 2,6-toluylene diisocyanate, about 2 parts of water, about 1.3 parts of a 33% solution of triethylene diamine in dipropylene glycol, about 0.5 part of silicone having the formula:

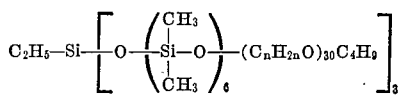

wherein ($C_nH_{2n}O$) is a mixed polyoxyethylene and oxypropylene block copolymer containing about 17 oxyethylene units and about 13 oxypropylene units, and about 0.2 part of a 1 to 1 mixture of stannous octoate and dioctyl phthalate. These compounds are discharged into a rectangular mold where they rise in about 90 seconds to produce a polyurethan foam. After curing for several hours this foam was then sliced into sheets having a thickness of ½ inch. The foam had the following properties:

(a) a density of 4.2 pounds per cubic foot
(b) An indentation load deflection at 25% deflection per square inch area for at least an 0.5 inch thickness of 60 pounds
(c) A compression set below 10% after 22 hours at 90% compression
(d) A tensile strength of 23 pounds per square inch
(e) An elongation of 145%, and
(f) Foam softening by linear shear of 37%.

The foam was provided with a polyvinyl chloride facing sheet having a thickness of about 2 mils by first applying a vinyl chloride plastisol to the polyvinyl chloride facing sheet and then bonding a polyvinyl chloride facing sheet to the sheet of polyurethane foam in face-to-face contact under heat and pressure. Thus a carpet underlay in accordance with the invention was produced suitable for use under any carpet and which can be conscientiously guaranteed for the life of the carpet.

EXAMPLES 2–6

Examples 2 through 6 are given in the following tables wherein the components listed under formulation are mixed and a foam is prepared in a first step and then sliced after curing for several hours into sheets having a thickness of ½ inch. The foam is then provided with a polyvinyl chloride facing sheet having a thickness of about 2 mils by first applying a vinyl chloride plastisol to the polyvinyl chloride facing sheet and then bonding a polyvinyl chloride facing sheet to the polyurethane foam in face-to-face contact under heat and pressure according to the procedure of British Pat. 1,081,567. The foam then exhibits the properties set forth in the following table:

|  | Examples | | | | |
|---|---|---|---|---|---|
|  | 2 | 3 | 4 | 5 | 6 |
| Formulation: | | | | | |
| A | | | | | 95 |
| B | 90 | 90 | 90 | 90 | |
| C | 10 | 10 | 10 | 10 | 5 |
| D | | | 2 | | |
| E | 1 | 1 | | 1 | 1 |
| F | 4 | | 3 | | |
| G | 1.7 | 2.5 | 2 | 2 | 2 |
| H | 0.8 | 0.8 | 0.8 | 0.8 | 0.8 |
| I | 1.0 | 1.0 | 1.0 | 1.0 | 1.0 |
| J | 0.2 | 0.2 | 0.2 | 0.2 | 0.2 |
| K | 0.1 | 0.15 | 0.1 | 0.1 | 0.1 |
| L | 0.3 | 0.45 | | 0.3 | 0.3 |
| M | 60.0 | 72 | 64 | 64 | 51 |
| Properties: | | | | | |
| Density, p.c.f. | 4.0 | 3.1 | 3.6 | 4.0 | 3.9 |
| ILD (½"), lbs./50 sq. in. at 25% deflection | 70 | 76 | 50 | 78 | 75 |
| Compression set, 22 hrs./90% at 158° F. | 4.5 | 10 | 6 | 7.5 | 8.9 |
| Tensile, p.s.i. | 19 | 20 | 19 | 22 | 15 |
| Elongation, percent | 77 | 68 | 80 | 79 | 88 |
| Ratio of ILD 65%/25% | 2.7 | 2.65 | 3.1 | 2.9 | 3 |
| Foam softening, percent | 25 | 43 | 31 | 31 | 44 |

NOTES:
A = A polyether prepared by reacting propylene oxide with glycerine to a hydroxyl number of about 56.
B = Polyether prepared by reacting trimethylol propane first with propylene oxide and then with ethylene oxide to a hydroxyl number of 26.
C = Diethylene glycol.
D = Lead diamyl dithiocarbamate.
E = Hydroquinone.
F = Trichloromonofluoromethane.
G = Water.
H = Triethylene diamine.
I = N-ethyl-morpholine.
J = Silicone oil having the formula:

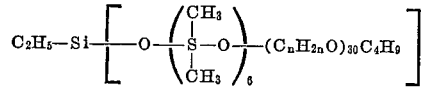

wherein ($C_nH_{2n}O$) is a mixed polyoxyethylene and oxypropylene block copolymer containing about 17 oxyethylene units and about 13 oxypropylene units.
K = Stannous octoate.
L = Dioctyl phthalate.
M = Polyphenyl polymethylene polyisocyanate having the formula:

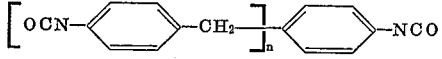

wherein $n$ equals 1.8.

It is to be understood that the foregoing examples are given for the purpose of illustration and that any other polyol, organic polyisocyanate, filler, facing sheet, adhesive or the like can be used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. As a new article of manufacture a carpet underlay having a self-sustaining facing layer and a polyurethane foam layer, facing surfaces of said layers being adhesively bound together, said polyurethane foam having
   (a) a density of about 3 to about 8 pounds per cubic foot,
   (b) an indentation load deflection of at least about 50 pounds at 25% deflection per 50-square-inch area of at least an 0.5 inch thickness,
   (c) a compression set below about 10% after 22 hours at 90% compression,
   (d) a tensile strength of at least about 10 pounds per square inch,
   (e) an elongation of at least about 50%, and
   (f) a foam softening by linear shear of less than 50%.

2. The carpet underlay of claim 1 wherein said polyurethane foam contains an inert filler.

3. The carpet underlay of claim 1 wherein said polyurethane foam contains barium sulfate in an amount of from 20 to 50% by weight.

4. The carpet underlay of claim 1 wherein said indentation load deflection is in the range of from about 60 to about 100 pounds.

5. The carpet underlay of claim 1 wherein said compression set is below about 5%, said tensile strength is in the range of 15 to 20 pounds per square inch and said elongation is in the range of 150 to 175 pounds per square inch.

6. The carpet underlay of claim 1 wherein said polyurethane foam is a type which has sufficient hydrolysis and dry heat aging resistance to maintain at least 75% of the original properties as shown in the ranges of claim 1.

7. The carpet underlay of claim 1 wherein said facing layer is a thermoplastic film.

8. The carpet underlay of claim 1 wherein said facing layer is polyvinyl chloride.

References Cited

UNITED STATES PATENTS 3,437,551    4/1969    Marshack _____ 161—160

WILLIAM J. VAN BALEN, Primary Examiner

U.S. Cl. X.R.

161—190; 260—2.5